(12) United States Patent
Edwards et al.

(10) Patent No.: US 7,710,436 B2
(45) Date of Patent: *May 4, 2010

(54) AUTOMATIC COLOR ADJUSTMENT OF A TEMPLATE DESIGN

(75) Inventors: Eric Edwards, San Francisco, CA (US); Clay Harvey Fisher, Belmont, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/358,956

(22) Filed: Jan. 23, 2009

(65) Prior Publication Data

US 2009/0136128 A1 May 28, 2009

Related U.S. Application Data

(60) Continuation of application No. 11/846,474, filed on Aug. 28, 2007, now Pat. No. 7,538,776, and a division of application No. 09/735,572, filed on Dec. 12, 2000, now Pat. No. 7,262,778.

(60) Provisional application No. 60/181,810, filed on Feb. 11, 2000.

(51) Int. Cl.
*G09G 5/02* (2006.01)
*G06K 9/00* (2006.01)
*G06K 9/62* (2006.01)
*G06K 9/68* (2006.01)
*G06K 9/60* (2006.01)
*G06T 7/20* (2006.01)
*H04N 1/48* (2006.01)

(52) U.S. Cl. .................. 345/593; 345/589; 345/157; 358/518; 358/522; 382/168; 382/209; 382/217; 715/825; 715/856; 715/860

(58) Field of Classification Search .............. None
See application file for complete search history.

(56) References Cited

U.S. PATENT DOCUMENTS 3,785,721 A 1/1974 Harsch
4,305,131 A 12/1981 Best (Continued)

FOREIGN PATENT DOCUMENTS

| EP | 2002-521850 | 6/2002 |
| JP | 60-033797 | 2/1985 |
| JP | 63-228304 | 9/1988 |
| JP | 11-119688 | 4/1999 |
| KR | 2001-046229 A | 6/2001 |

OTHER PUBLICATIONS

"Assistive Computer Technology for Windows, 98 Training Manual", *HIgh Tech Center Training Unit of the CA Community Colleges at the Foothill-De Anza Comunity College District*, http://htctu.fhda.edu, (Jul. 2000), 1-8.

(Continued)

*Primary Examiner*—Wesner Sajous
(74) *Attorney, Agent, or Firm*—Blakely, Sokolofy, Taylor & Zafman LLP

(57) ABSTRACT

The present invention generates a color template design. According to one aspect, a source image is selected. Colors of a selected template design are adjusted automatically based on placement of a cursor on a source image that is separate from the template design. The adjusted color on the template design may match the color of the source image. Alternatively, a color template design system may be configured to adjust the color to a contrast or any predetermined variation of the color of the source image. The system may display the selected template design after automatically adjusting colors and store the selected template design for use as a template. The template design may include a framing portion, a mat portion, a foreground portion, and a background portion and at least one of those portions may be adjusted based on the placement of the cursor on the source image.

16 Claims, 6 Drawing Sheets

U.S. PATENT DOCUMENTS

| | | |
|---|---|---|
| 4,485,409 A | 11/1984 | Schumacher |
| 4,625,288 A | 11/1986 | Weiner et al. |
| 4,707,742 A | 11/1987 | Field et al. |
| 4,902,128 A | 2/1990 | Siebecker et al. |
| 4,905,294 A | 2/1990 | Sugiura et al. |
| 4,907,086 A | 3/1990 | Truong |
| 4,941,391 A | 7/1990 | Ehmig et al. |
| 4,942,391 A | 7/1990 | Kikuta |
| 4,954,970 A | 9/1990 | Walker et al. |
| 5,019,858 A | 5/1991 | Suzuki |
| 5,091,967 A | 2/1992 | Ohsawa |
| 5,099,331 A | 3/1992 | Truong |
| 5,100,154 A | 3/1992 | Mullins |
| 5,111,410 A | 5/1992 | Nakayama et al. |
| 5,187,754 A | 2/1993 | Currin et al. |
| 5,193,000 A | 3/1993 | Lipton et al. |
| 5,267,154 A | 11/1993 | Takeuchi et al. |
| 5,270,806 A | 12/1993 | Venable et al. |
| 5,303,148 A | 4/1994 | Mattson et al. |
| 5,325,449 A | 6/1994 | Burt et al. |
| 5,327,521 A | 7/1994 | Savic et al. |
| 5,428,723 A | 6/1995 | Ainscow et al. |
| 5,465,163 A | 11/1995 | Yoshihara et al. |
| 5,477,264 A | 12/1995 | Sarbadhikari et al. |
| 5,488,674 A | 1/1996 | Burt et al. |
| 5,524,071 A | 6/1996 | Yokomizo |
| 5,559,707 A | 9/1996 | DeLorme et al. |
| 5,561,745 A | 10/1996 | Jackson et al. |
| 5,600,765 A | 2/1997 | Ando et al. |
| 5,606,656 A | 2/1997 | Yamaguchi |
| 5,611,028 A | 3/1997 | Shibasaki et al. |
| 5,615,123 A | 3/1997 | Davidson et al. |
| 5,629,988 A | 5/1997 | Burt et al. |
| 5,630,037 A | 5/1997 | Schindler |
| 5,633,678 A | 5/1997 | Parulski et al. |
| 5,634,012 A | 5/1997 | Stefik et al. |
| 5,643,088 A | 7/1997 | Vaughn et al. |
| 5,649,032 A | 7/1997 | Burt et al. |
| 5,675,733 A | 10/1997 | Williams |
| 5,679,075 A | 10/1997 | Forrest et al. |
| 5,682,326 A | 10/1997 | Klingler et al. |
| 5,682,525 A | 10/1997 | Bouve et al. |
| 5,684,942 A | 11/1997 | Kimura |
| 5,689,575 A | 11/1997 | Sako et al. |
| 5,694,331 A | 12/1997 | Yamamoto et al. |
| 5,706,368 A | 1/1998 | Mita |
| 5,710,887 A | 1/1998 | Chelliah et al. |
| 5,720,806 A | 2/1998 | Fujii et al. |
| 5,721,827 A | 2/1998 | Logan et al. |
| 5,727,093 A | 3/1998 | Uchiyama et al. |
| 5,727,174 A | 3/1998 | Aparicio, IV et al. |
| 5,727,201 A | 3/1998 | Burke |
| 5,732,146 A | 3/1998 | Yamada et al. |
| 5,732,161 A | 3/1998 | Kuroda et al. |
| 5,732,216 A | 3/1998 | Logan et al. |
| 5,734,823 A | 3/1998 | Saigh et al. |
| 5,737,538 A | 4/1998 | Wilhite |
| 5,740,549 A | 4/1998 | Reilly et al. |
| 5,748,898 A | 5/1998 | Ueda |
| 5,751,838 A | 5/1998 | Cox et al. |
| 5,751,848 A | 5/1998 | Farrell |
| 5,760,916 A | 6/1998 | Dellert et al. |
| 5,764,386 A * | 6/1998 | Robinson .................... 358/504 |
| 5,767,893 A | 6/1998 | Chen et al. |
| 5,768,142 A | 6/1998 | Jacobs |
| 5,768,528 A | 6/1998 | Stumm |
| 5,771,354 A | 6/1998 | Crawford |
| 5,781,665 A | 7/1998 | Cullen et al. |
| 5,794,006 A | 8/1998 | Sanderman |
| 5,802,292 A | 9/1998 | Mogul |
| 5,802,361 A | 9/1998 | Wang et al. |
| 5,805,745 A | 9/1998 | Graf |
| 5,819,092 A | 10/1998 | Ferguson et al. |
| 5,831,590 A | 11/1998 | Ikedo |
| 5,831,617 A | 11/1998 | Bhukhanwala |
| 5,835,087 A | 11/1998 | Herz et al. |
| 5,838,828 A | 11/1998 | Mizuki et al. |
| 5,838,837 A | 11/1998 | Hirosawa |
| 5,838,839 A | 11/1998 | Seki et al. |
| 5,841,899 A | 11/1998 | Ide et al. |
| 5,845,062 A | 12/1998 | Branton, Jr. et al. |
| 5,845,281 A | 12/1998 | Benson et al. |
| 5,848,183 A | 12/1998 | Farrell |
| 5,850,474 A | 12/1998 | Fan et al. |
| 5,852,450 A | 12/1998 | Thingvold |
| 5,852,683 A | 12/1998 | Jewel |
| 5,855,516 A | 1/1999 | Eiba |
| 5,857,074 A | 1/1999 | Johnson |
| 5,861,871 A | 1/1999 | Venable |
| 5,864,329 A | 1/1999 | Hirokawa |
| 5,864,827 A | 1/1999 | Wilson |
| 5,870,717 A | 2/1999 | Wiecha |
| 5,872,637 A | 2/1999 | Nakanishi |
| 5,880,778 A | 3/1999 | Akagi |
| 5,881,166 A | 3/1999 | Farrell |
| 5,881,168 A | 3/1999 | Takaoka et al. |
| 5,881,182 A | 3/1999 | Fiete et al. |
| 5,884,280 A | 3/1999 | Yoshioka et al. |
| 5,889,868 A | 3/1999 | Moskowitz et al. |
| 5,890,175 A | 3/1999 | Wong et al. |
| 5,897,622 A | 4/1999 | Blinn et al. |
| 5,905,819 A | 5/1999 | Daly |
| 5,918,009 A | 6/1999 | Gehani et al. |
| 5,920,657 A | 7/1999 | Bender et al. |
| 5,923,846 A | 7/1999 | Gage et al. |
| 5,924,090 A | 7/1999 | Krellenstein |
| 5,930,405 A | 7/1999 | Chida |
| 5,933,524 A | 8/1999 | Schuster et al. |
| 5,937,104 A | 8/1999 | Henderson et al. |
| 5,937,392 A | 8/1999 | Alberts |
| 5,937,734 A | 8/1999 | Stiefel et al. |
| 5,940,600 A | 8/1999 | Staats et al. |
| 5,940,806 A | 8/1999 | Danial |
| 5,942,969 A | 8/1999 | Wicks |
| 5,944,769 A | 8/1999 | Musk et al. |
| 5,948,040 A | 9/1999 | DeLorme et al. |
| 5,948,061 A | 9/1999 | Merriman et al. |
| 5,949,875 A | 9/1999 | Walker et al. |
| 5,956,716 A | 9/1999 | Kenner et al. |
| 5,960,409 A | 9/1999 | Wexler |
| 5,963,664 A | 10/1999 | Kumar et al. |
| 5,968,120 A | 10/1999 | Guedalia |
| 5,970,143 A | 10/1999 | Schneier et al. |
| 5,970,183 A | 10/1999 | Amemiya et al. |
| 5,973,734 A | 10/1999 | Anderson |
| 5,974,198 A | 10/1999 | Hamburg et al. |
| 5,974,451 A | 10/1999 | Simmons |
| 5,978,519 A | 11/1999 | Bollman et al. |
| 5,982,891 A | 11/1999 | Ginter et al. |
| 5,982,931 A | 11/1999 | Ishimaru |
| 5,982,941 A | 11/1999 | Loveridge et al. |
| 5,982,944 A | 11/1999 | Vaidyanathan et al. |
| 5,982,951 A | 11/1999 | Katayama et al. |
| 5,983,200 A | 11/1999 | Slotznick |
| 5,986,660 A | 11/1999 | Sweatt, III |
| 5,987,166 A | 11/1999 | Hayashi et al. |
| 5,990,860 A | 11/1999 | Takeuchi |
| 5,990,908 A | 11/1999 | Thingvold |
| 5,991,740 A | 11/1999 | Messer |
| 5,999,662 A | 12/1999 | Burt et al. |
| 6,000,832 A | 12/1999 | Franklin et al. |
| 6,005,548 A | 12/1999 | Latypov et al. |
| 6,005,987 A | 12/1999 | Nakamura et al. |
| 6,006,197 A | 12/1999 | d'Eon |

| Patent No. | Date | Inventor(s) | Patent No. | Date | Inventor(s) |
|---|---|---|---|---|---|
| 6,006,231 A | 12/1999 | Popa | 6,237,010 B1 | 5/2001 | Hui et al. |
| 6,011,537 A | 1/2000 | Slotznick | 6,256,451 B1 | 7/2001 | Mitsui |
| 6,014,471 A | 1/2000 | Barkan et al. | 6,272,231 B1 | 8/2001 | Maurer et al. |
| 6,014,681 A | 1/2000 | Walker et al. | 6,272,532 B1 | 8/2001 | Feinleib |
| 6,014,701 A | 1/2000 | Chaddha | 6,282,330 B1 | 8/2001 | Yokota et al. |
| 6,016,354 A | 1/2000 | Lin et al. | 6,301,440 B1 | 10/2001 | Bolle et al. |
| 6,016,356 A | 1/2000 | Ito et al. | 6,301,555 B2 | 10/2001 | Hinderks et al. |
| 6,018,600 A | 1/2000 | Levin et al. | 6,301,586 B1 | 10/2001 | Yang et al. |
| 6,018,761 A | 1/2000 | Uomini | 6,307,979 B1 | 10/2001 | Kondo et al. |
| 6,020,886 A | 2/2000 | Jacober et al. | 6,312,337 B1 | 11/2001 | Edwards |
| 6,021,433 A | 2/2000 | Payne et al. | 6,313,835 B1 | 11/2001 | Gever et al. |
| 6,023,521 A | 2/2000 | Sarpeshkar et al. | 6,313,902 B1 | 11/2001 | Enomoto |
| 6,023,701 A | 2/2000 | Malik et al. | 6,321,202 B1 | 11/2001 | Raveis, Jr. |
| 6,026,183 A | 2/2000 | Talluri et al. | 6,324,545 B1 | 11/2001 | Morag |
| 6,026,200 A | 2/2000 | Okude et al. | 6,333,752 B1 | 12/2001 | Hasegawa et al. |
| 6,026,371 A | 2/2000 | Beck et al. | 6,336,052 B1 | 1/2002 | Ouellet et al. |
| 6,028,583 A | 2/2000 | Hamburg | 6,340,971 B1 | 1/2002 | Janse et al. |
| 6,028,958 A | 2/2000 | Kanamori | 6,341,279 B1 | 1/2002 | Nye |
| 6,028,985 A | 2/2000 | Okuyama | 6,343,738 B1 | 2/2002 | Ogilvie |
| 6,032,156 A | 2/2000 | Marcus | 6,344,903 B1 | 2/2002 | Derhak et al. |
| 6,034,759 A | 3/2000 | Enomoto | 6,351,321 B1 | 2/2002 | McIntyre et al. |
| 6,035,323 A | 3/2000 | Narayen et al. | 6,358,054 B1 | 3/2002 | Rothenberg |
| 6,037,937 A | 3/2000 | Beaton et al. | 6,358,055 B1 | 3/2002 | Rothenberg |
| 6,041,316 A | 3/2000 | Allen | 6,358,341 B1 | 3/2002 | Bergquist |
| 6,044,181 A | 3/2000 | Szeliski et al. | 6,359,270 B1 | 3/2002 | Bridson |
| 6,052,492 A | 4/2000 | Bruckhaus | 6,362,900 B1 | 3/2002 | Squilla et al. |
| 6,052,600 A | 4/2000 | Fette et al. | 6,363,411 B1 | 3/2002 | Dugan et al. |
| 6,054,999 A | 4/2000 | Strandberg | 6,369,837 B1 | 4/2002 | Schirmer |
| 6,058,379 A | 5/2000 | Odom et al. | 6,388,686 B1 | 5/2002 | Hetherington et al. |
| 6,058,428 A | 5/2000 | Wang et al. | 6,388,732 B1 | 5/2002 | Williams et al. |
| 6,061,471 A | 5/2000 | Coleman, Jr. | 6,396,963 B2 | 5/2002 | Shaffer et al. |
| 6,067,095 A | 5/2000 | Danieli | 6,405,178 B1 | 6/2002 | Manchala et al. |
| 6,069,707 A | 5/2000 | Pekelman | 6,407,745 B1 | 6/2002 | Yamada et al. |
| 6,074,299 A | 6/2000 | Cohen | 6,407,777 B1 | 6/2002 | DeLuca |
| 6,076,077 A | 6/2000 | Saito | 6,408,301 B1 | 6/2002 | Patton et al. |
| 6,081,278 A | 6/2000 | Chen | 6,411,744 B1 | 6/2002 | Edwards |
| 6,083,158 A | 7/2000 | Bearman et al. | 6,411,999 B1 | 6/2002 | Tinkler |
| 6,085,195 A | 7/2000 | Hoyt et al. | 6,424,789 B1 | 7/2002 | Abdel-Mottaleb |
| 6,085,249 A | 7/2000 | Wang et al. | 6,434,579 B1 | 8/2002 | Shaffer et al. |
| 6,088,340 A * | 7/2000 | Buchholz et al. ............ 370/310 | 6,437,306 B1 | 8/2002 | Melen |
| 6,088,702 A | 7/2000 | Plantz et al. | 6,437,797 B1 | 8/2002 | Ota |
| 6,097,389 A | 8/2000 | Morris et al. | 6,441,854 B2 | 8/2002 | Fellegara et al. |
| 6,102,406 A | 8/2000 | Miles et al. | 6,463,462 B1 | 10/2002 | Smith et al. |
| 6,102,796 A | 8/2000 | Pajitnov et al. | 6,463,468 B1 | 10/2002 | Buch et al. |
| 6,104,441 A | 8/2000 | Wee et al. | 6,469,711 B2 | 10/2002 | Foreman |
| 6,109,923 A | 8/2000 | Rothenberg | 6,473,803 B1 | 10/2002 | Stern et al. |
| 6,112,226 A | 8/2000 | Weaver et al. | 6,484,189 B1 | 11/2002 | Gerlach, Jr. et al. |
| 6,115,052 A | 9/2000 | Freeman et al. | 6,493,685 B1 | 12/2002 | Ensel et al. |
| 6,118,459 A | 9/2000 | Hunter | 6,496,744 B1 | 12/2002 | Cook |
| 6,123,362 A | 9/2000 | Squilla et al. | 6,496,851 B1 | 12/2002 | Morris et al. |
| 6,125,385 A | 9/2000 | Wies et al. | 6,509,910 B1 | 1/2003 | Agarwal et al. |
| 6,141,666 A | 10/2000 | Tobin | 6,512,570 B2 | 1/2003 | Garfinkle et al. |
| 6,144,726 A | 11/2000 | Cross | 6,519,632 B1 | 2/2003 | Brackett et al. |
| 6,147,742 A | 11/2000 | Bell et al. | 6,522,351 B1 | 2/2003 | Park |
| 6,148,280 A | 11/2000 | Kramer | 6,522,418 B2 | 2/2003 | Yokomizo et al. |
| 6,154,755 A | 11/2000 | Dellert et al. | 6,526,215 B2 | 2/2003 | Hirai et al. |
| 6,167,382 A | 12/2000 | Sparks | 6,538,698 B1 | 3/2003 | Anderson |
| 6,169,544 B1 | 1/2001 | Onoda | 6,545,556 B1 | 4/2003 | Raffalt et al. |
| 6,169,854 B1 | 1/2001 | Hasegawa et al. | 6,546,556 B1 | 4/2003 | Kataoka et al. |
| 6,178,258 B1 | 1/2001 | Sugimoto | 6,552,729 B1 | 4/2003 | Di Bernardo et al. |
| 6,192,183 B1 | 2/2001 | Taniguchi et al. | 6,552,743 B1 | 4/2003 | Rissman |
| 6,195,101 B1 | 2/2001 | Ghislain Bossut et al. | 6,567,825 B2 | 5/2003 | Bogia |
| 6,195,458 B1 | 2/2001 | Warnick et al. | 6,567,980 B1 | 5/2003 | Jain et al. |
| 6,201,548 B1 | 3/2001 | Cariffe et al. | 6,567,983 B1 | 5/2003 | Shiimori |
| 6,202,061 B1 | 3/2001 | Khosla et al. | 6,571,221 B1 | 5/2003 | Stewart et al. |
| 6,202,155 B1 | 3/2001 | Tushie et al. | 6,571,255 B1 | 5/2003 | Gonsalves et al. |
| 6,215,498 B1 | 4/2001 | Filo et al. | 6,573,927 B2 | 6/2003 | Parulski et al. |
| 6,215,526 B1 | 4/2001 | Barton et al. | 6,577,311 B1 | 6/2003 | Crosby et al. |
| 6,216,112 B1 | 4/2001 | Fuller et al. | 6,577,760 B1 | 6/2003 | Ohta et al. |
| 6,222,570 B1 | 4/2001 | Takayama et al. | 6,578,014 B1 | 6/2003 | Murcko, Jr. |
| 6,222,947 B1 | 4/2001 | Koba | 6,583,799 B1 | 6/2003 | Manolis et al. |
| 6,224,486 B1 | 5/2001 | Walker et al. | 6,587,596 B1 | 7/2003 | Haeberli |
| 6,230,194 B1 | 5/2001 | Frailong et al. | 6,590,584 B1 | 7/2003 | Yamaura et al. |

| | | |
|---|---|---|
| 6,590,586 B1 | 7/2003 | Swenton-Wall et al. |
| 6,609,106 B1 | 8/2003 | Robertson |
| 6,625,624 B1 | 9/2003 | Chen et al. |
| 6,625,651 B1 | 9/2003 | Swartz et al. |
| 6,631,522 B1 | 10/2003 | Erdelyi |
| 6,633,689 B2 | 10/2003 | Yamamoto |
| 6,636,648 B2 | 10/2003 | Loui et al. |
| 6,643,663 B1 | 11/2003 | Dabney et al. |
| 6,647,125 B2 | 11/2003 | Matsumoto et al. |
| 6,647,126 B1 | 11/2003 | Wen |
| 6,668,134 B1 | 12/2003 | Niikawa |
| 6,686,918 B1 | 2/2004 | Cajolet et al. |
| 6,697,825 B1 | 2/2004 | Underwood et al. |
| 6,701,011 B1 | 3/2004 | Nakajima |
| 6,701,343 B1 | 3/2004 | Kenyon |
| 6,701,441 B1 | 3/2004 | Balasubramaniam et al. |
| 6,711,594 B2 | 3/2004 | Yano et al. |
| 6,734,883 B1 | 5/2004 | Wynn et al. |
| 6,746,120 B2 | 6/2004 | Broderick et al. |
| 6,771,801 B1 | 8/2004 | Fisher et al. |
| 6,819,449 B2 | 11/2004 | Haneda et al. |
| 6,847,373 B1 | 1/2005 | Gonsalves et al. |
| 6,912,311 B2 | 6/2005 | Anderson et al. |
| 6,914,925 B2 | 7/2005 | Shinagawa et al. |
| 6,940,526 B2 | 9/2005 | Noda et al. |
| 6,954,282 B2 | 10/2005 | Miyamoto et al. |
| 7,262,778 B1 * | 8/2007 | Edwards et al. ............ 345/589 |
| 2001/0032229 A1 | 10/2001 | Hulls et al. |
| 2001/0032443 A1 | 10/2001 | Tiley et al. |
| 2001/0034646 A1 | 10/2001 | Hoyt et al. |
| 2001/0037205 A1 | 11/2001 | Joao |
| 2001/0041022 A1 | 11/2001 | Edwards |
| 2002/0049624 A1 | 4/2002 | Raveis, Jr. |
| 2002/0052785 A1 | 5/2002 | Tenenbaum |
| 2002/0059364 A1 | 5/2002 | Coulthard et al. |
| 2002/0071028 A1 | 6/2002 | Ezawa |
| 2002/0091576 A1 | 7/2002 | Giordano, III et al. |
| 2002/0118182 A1 | 8/2002 | Luther Weindorf |
| 2002/0133412 A1 | 9/2002 | Oliver et al. |
| 2002/0149676 A1 | 10/2002 | Hatori |
| 2002/0178450 A1 | 11/2002 | Morita et al. |
| 2002/0194081 A1 | 12/2002 | Perkowski |
| 2003/0034979 A1 | 2/2003 | Nakamura et al. |
| 2003/0093493 A1 | 5/2003 | Watanabe et al. |
| 2003/0097361 A1 | 5/2003 | Huang et al. |
| 2003/0163431 A1 | 8/2003 | Ginter et al. |
| 2003/0167213 A1 | 9/2003 | Jammes et al. |
| 2004/0078274 A1 | 4/2004 | Aarnio |
| 2005/0231611 A1 | 10/2005 | Anderson et al. |
| 2005/0263026 A1 | 12/2005 | Aosaki et al. |

OTHER PUBLICATIONS

"Game Commander", *Mindmaker Game Commander User's Guide*, (1998).

"ImageID announces AtraCam: the amusement-photography system for the Internet age", *ImageID Press Release*, (Jan. 31, 2000).

"ImageID's Smart Picture technology to change the way people get their pictures . . . forever", *ImageID Press Release*, (Jan. 31, 2000).

Bruderlin, Armin, et al., "Motion Signal Processing", *Proceedings of the 22nd Annual Conference on Computer Graphics and Interactive Techingues*, (1995), 97-104.

Chandra, Surendar, et al., "JPEG Compression Metric as a Quality Aware Image Transcoding", *2nd USENIX Symposium On Internet Technologies & Systems*. (1999), 81-92.

England, Paul, et al., "I/Browse: The Bellcore Video Library Toolkit", *SPIE*, vol. 2670, (1996), 254-264.

Gleicher, Michael, "Retargetting Motion to New Characters", *Proceedings of the 25th Annual Conference on Computer Graphics and Interactive Techniques*, (Jul. 1998), 33-42.

Iap, Sin-Yuan, et al., "ASIS MDL: A Prototype Electronic Content Service", *IEEE DARE*, (1998).

Macedonia, Michael, "Distributed File Sharing: Barbarians at the Gates?", *IEEE Computer Magazine*, (Aug. 2000), 99-101.

Person, P., "MP3, a De Facto Standard for Music on the Internet", *IEE Presentation*, London, (Mar. 26, 1999), 1-5.

Sturman, David J., "Computer Puppetry", 1998 *Computer Graphics and Applications, IEEE*, vol. 18, No. 1, (1998), 38-45.

Yagawa, Yuichi, et al., "The Digital Album: A Personal File-tainment System", *Proceedings of Multimedia '96*, (1996), 433-439.

Yilmaz, Emre, "Motion Capture and Puppetry", *ACM SIGGRAPH 97 Visual Proceedings: The art and interdisciplinary programs of SIGGRAPH '97*(1997), 209.

* cited by examiner

HISTOGRAM OF SOURCE IMAGE

US 7,710,436 B2

AUTOMATIC COLOR ADJUSTMENT OF A TEMPLATE DESIGN

RELATED APPLICATIONS

This application is a continuation of application Ser. No. 11/846,474, filed Aug. 28, 2007, allowed, which is a divisional of application Ser. No. 09/735,572 filed Dec. 12, 2000, now U.S. Pat. No. 7,262,778, which claims priority pursuant to 35 U.S.C. 119(e) to U.S. Provisional Application No. 60/181,810, filed Feb. 11, 2000, each of which is hereby incorporated by reference in its entirety.

FIELD OF THE INVENTION

The present invention relates to color template generation techniques. More particularly, the present invention relates to automatic color adjustment of a template design.

COPYRIGHT NOTICE/PERMISSION

A portion of the disclosure of this patent document may contain material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 1999, Sony Electronics, Inc., All Rights Reserved.

BACKGROUND OF THE INVENTION

Growth in technology and business transactions has given rise to a need for making presentations in all occupational fields. Presentations are regularly conducted in sales, advertising, negotiations, speeches, seminars, educational courses, and several other areas. Due to the extensive amount of presentations made today, it has become important to format the presentation is an attractive template to bring forth the information being presented.

Currently several template options are available to a consumer for making a presentation. The options available are for a user to select a type of pre-designed template for their information or image being presented. Pre-designed templates are of a pre-determined format and pre-determined color. A consumer has the options of selecting one of the pre-determined templates and using it as the template for the presentation.

A drawback of choosing a predetermined template with pre-determined format and pre-determined color is that the consumer is not able to match the template's appearance to the appearance of the information or the image being presented. Since appearance is the main reason for using a template, a pre-determined template creates a mismatch and does not bring forth the information being presented in its best format. The mismatch in some cases creates a distraction for the viewers instead of enhancing the information.

Another drawback for selecting a pre-determined template with pre-determined format and colors is that the consumer is not able to modify or change the parameters of the pre-determined template to suit the presentation. Thus the consumer has to spend a large amount of time trying to find a pre-determined template that is close to the desired format and color and thus creates a non-user friendly template which lacks in providing ease of use to the consumer.

SUMMARY OF THE INVENTION

The present invention generates a color template design. According to one aspect, a source image is selected. Colors of a selected template design are adjusted automatically using color data collected from the selected source image. A histogram may be generated for the selected source image. The histogram may be analyzed to automatically adjust the colors of the selected template design.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense, and the scope of the present invention is defined only by the appended claims.

Figure 1A:
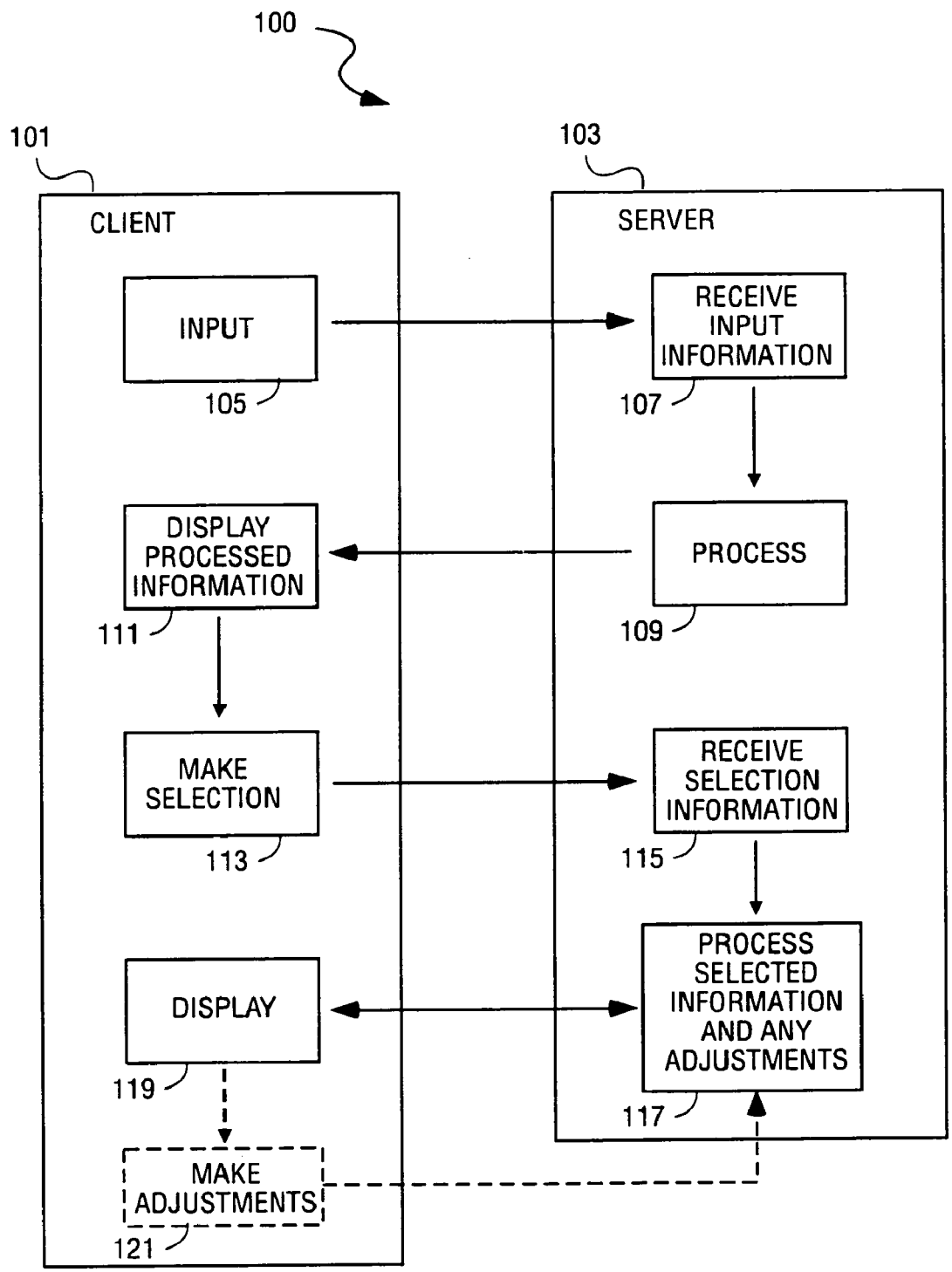
FIG. 1A is a diagram of one embodiment illustrating an overview of the operation.

Beginning with an overview of the operation of the invention, FIG. 1A illustrates one embodiment of a color template design system. The color template design system may have one or more clients 101 interacting with one or more servers 103 to generate a color template design. The server 103 and the client 101 communicate directly with each other. In one embodiment, server 103 and client 101 communicate through an intermediary such as a caching proxy server. In another embodiment, the server 103 and the client 101 are on separate local area networks (LAN). In another embodiment the server 103 and the client 101 are connected through a wide area network. The server 103 and client 101 interact with each other for sending various types of data, such as different types of streaming media data in various formats. In one embodiment, the streaming media data is sent in a downstream direction from server 103 to client 101. In another embodiment the client 101 sends a request and other streaming media data information to server 103.

A client 101 sends source image and template design selection information through input 105 to the server 103. The input may be through the various types of electronic devices and methods commonly known, for example, a stand-alone computer, a network computer, broadcast system, and an online World Wide Web submission. The server 103 receives the input information from the client 101 and posts the information in receiving area 107.

The server 103 sends the input information from its receiving area 107 to its processing area 109 for processing the input information. Processing performed at processing area 109 consists of processing functions such as evaluating user selection, generating histograms, selecting colors based on histograms, and providing color selection information.

The server 103 sends the processed information from its processing area 109 to the client's 101 displaying area 111. The display may be a PLAY function on a video, television screen, computer screen, or may be a video clip or PLAY function on an online system. The client 101 views the display in its display area 111 and sends the display information to its selection area 113. At selection area 113, the client 101 makes a color selection for the template design and sends the selected information back to server 103.

The server 103 receives the selection information from the client 101 and posts the selection information in its receiving area 115.

The server 103 sends the selection information in receiving area 115 to its processing area 117 for processing the selection information. Processing at processing area 117 consists of approving the selection, applying selection information to the template design and sending the template design with applied color selection for display to the client 101. The server 103 sends the processed information from its processing area 117 to the client 101 for displaying the processed information.

The client 101 receives the processed information, the adjusted color template design, and displays the color template design in displaying area 119. The client 101 can accept the displayed color template design and display the color template design in displaying area 119 as the template for the color template design system.

Alternatively, client 101 may choose to adjust the color template design selection. In this case, the client 101 sends the displayed color template design information from its display area 199 to make adjustments area 121. The client 101 makes the desired adjustments and sends the adjustment information to the server 103 for adjustments. The server 103 receives the adjustment information in its processing area 117 and processes the adjustment information to make the adjustments requested by the client 101. The server 103 sends the adjusted information to client 101 for displaying the adjusted information. The client 101 receives the adjusted information, the color template design, and displays the color template design as the template for the color template design system.

The processing stages and areas described, are examples of methods that can be utilized for separating one processing stage from another and one area from another. One skilled in the art will appreciate that the processing stages and areas may be designed in various combinations to derive the same result and are not to be construed as a limiting feature of this invention. For example, processing stages can be combined into one processing mode and interact with the client 101 through a single processing mode.

Figure 1B:
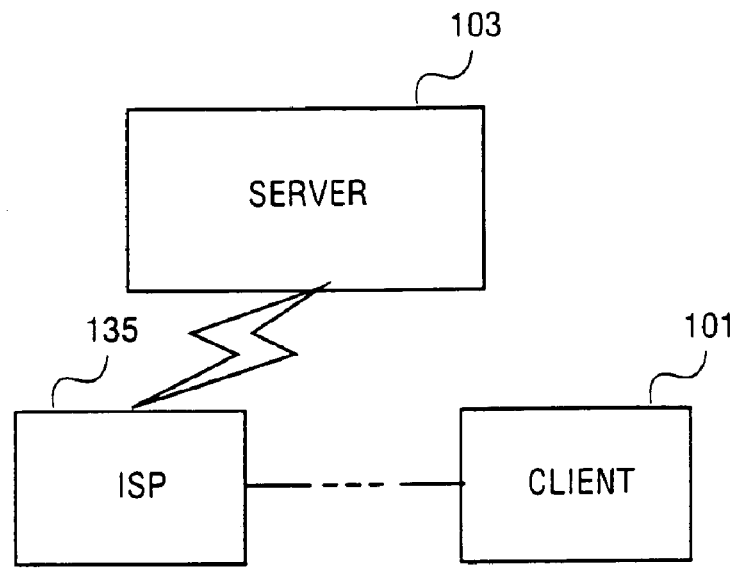
FIGS. 1B and 1C are block diagrams of an exemplary digital computer processing environment suitable for practicing the invention according to one embodiment.

In one embodiment, as shown in FIG. 1B, the color template design server computer 103 hosts a color template design web site and is part of, or coupled to, an ISP (Internet Service Provider) 135 to provide a color template design. Client computer 101 that includes input 105, display 111, selection 113, display 119, and make adjustment area 121, executes a conventional Internet browsing application to exchange data with the server 103. Execution of the Internet browsing application causes a web page to be displayed. The displayed web page contains a variety of selection features, color template design options, various templates and colors, and advertisements and banners for various products and services.

In another embodiment, an online service provider, company or person offers an online service for providing a color template design with various colors and receives compensation for their services. The compensation can be in the form of a fee. For example a fee is submitted to the online service provider through use of a credit card. Alternatively, the service provider charges a fee for submission and provides the individual with a template design with a variety of colors for downloading or allows the user to view the online.

It is readily apparent that the present invention is not limited to Internet access and Internet web-based sites; directly coupled and private networks are also contemplated.

Figure 1C:
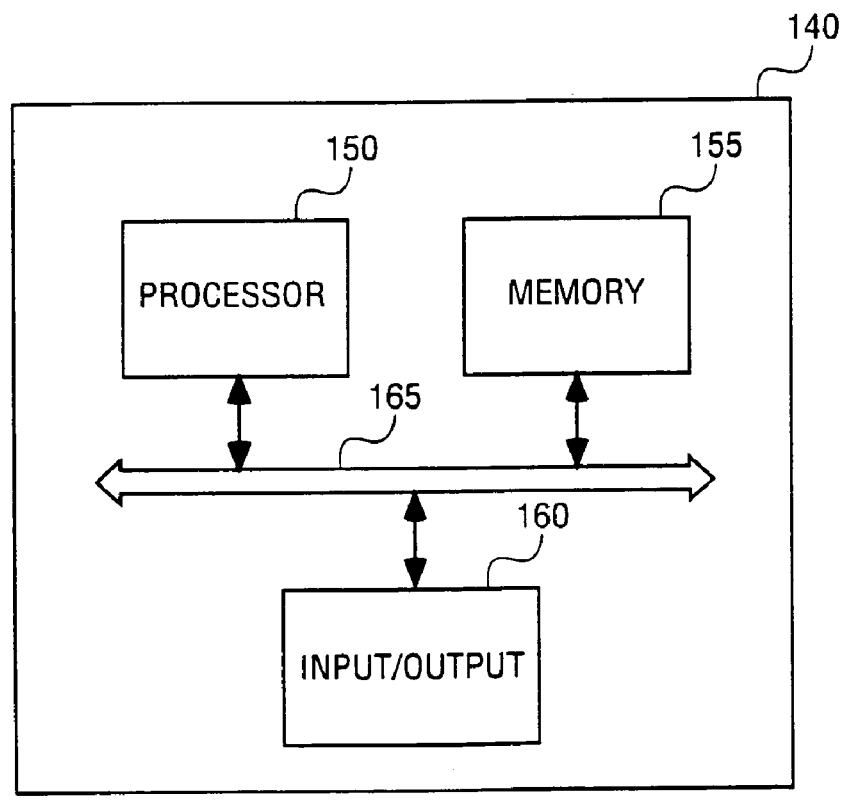

FIG. 1C. is a block diagram of an exemplary digital computer processing system 140, for use as a color template design server 103 according to one embodiment. The computer system 140 includes a processor 150, memory 155 and input/output capability 160 coupled to a system bus 165. The memory 155 is configured to store instructions which, when executed by the processor 150, perform the methods described herein. The memory 155 may also store data and content related to color template designs and colors. Input/output 160 provides for the delivery and display of template designs with various colors or portions or representations thereof. Input/output 160 also encompasses various types of computer-readable media, including any type of storage device that is accessible by the processor 150. It will also be appreciated that the server 103 is controlled by operating system software executing in memory 155. Input/output and related media 160 store the computer-executable instructions for the operating system and methods of the present invention as well as the data and content related to the stories.

The description of FIGS. 1B-C is intended to provide an overview of computer hardware and other operating components suitable for implementing the invention, but is not intended to limit the applicable environments. It will be appreciated that the computer system 140 is one example of many possible computer systems which have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

While the invention is not limited to any particular system configuration, for sake of clarity a simplified server having a receiving area and separate processing stages has been described.

Figure 2:
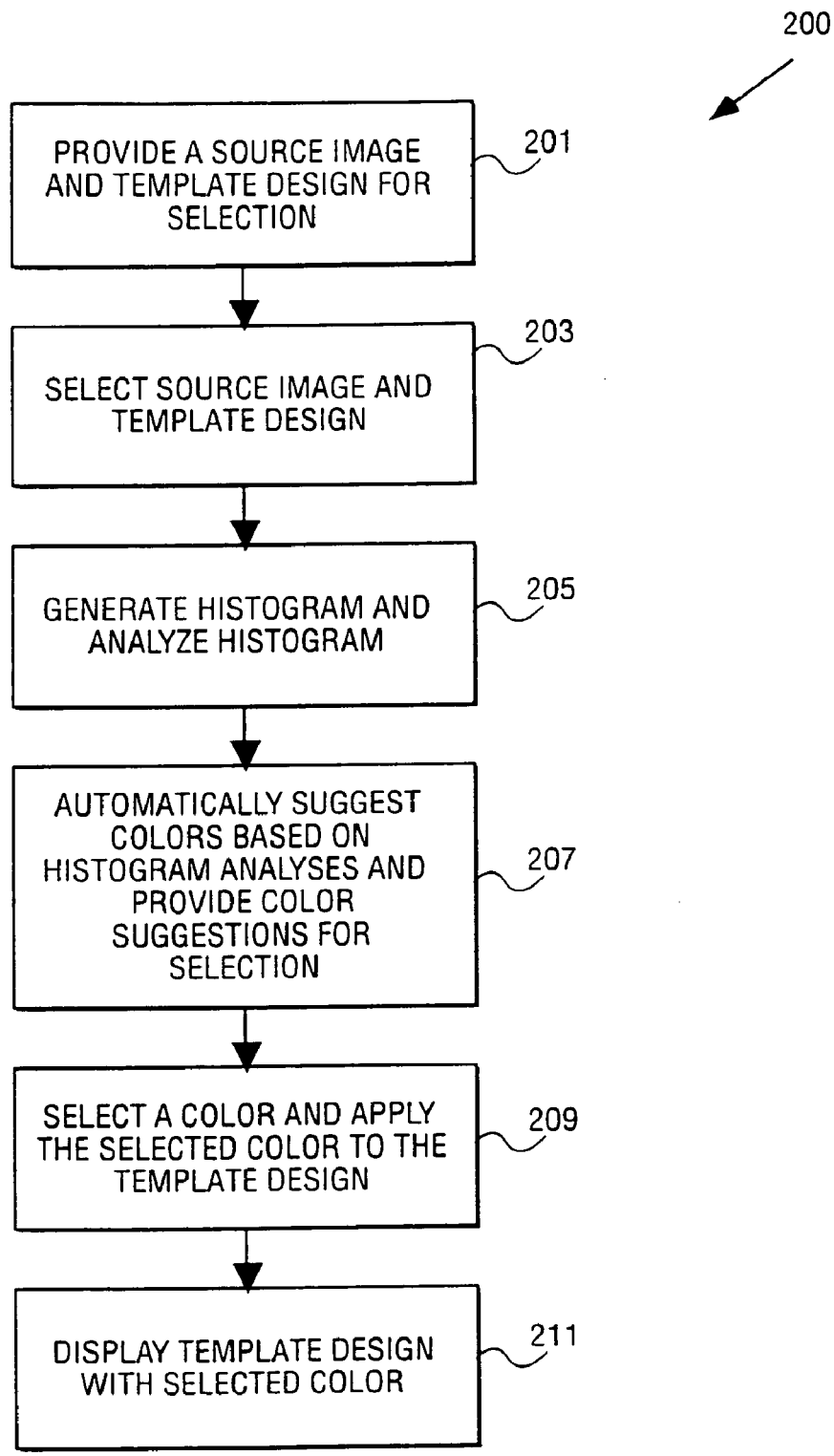
FIG. 2 is a flow diagram of one embodiment to generate a color template design.
Figure 3:
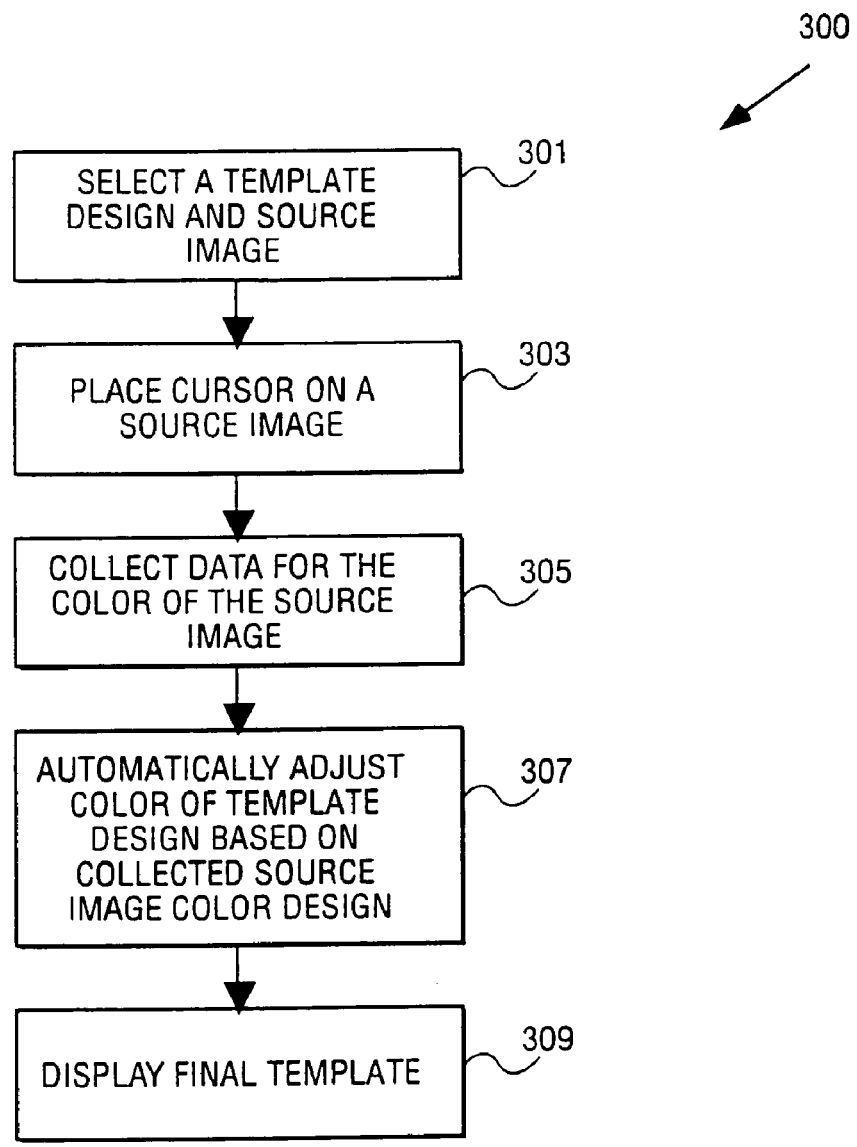
FIG. 3 is a flow diagram of one embodiment to generate a color template design.

FIGS. 2, and 3 describe methods by reference to flow diagrams that enables one skilled in the art to develop such programs including such instructions to carry out the methods on suitably configured computers (the processor of the computer executing the instructions from computer-readable media). If written in a programming language conforming to a recognized standard, such instructions can be executed on a variety of hardware platforms and for interface to a variety of operating systems.

In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result.

FIG. 2 is a flow diagram of one embodiment of a method 200 to generate a color template design. Method 200 can be implemented by digital processing system 140. Referring to FIG. 2, at operation block 201, a source image and template design is provided for selection. The source image and the template design are provided simultaneously for a user to select the source image and the template design. Alternatively, source image and template design are provided for selection one after another.

At operation block 203, a selection is made. A user of the color template design system selects the source image and the template design either simultaneously or one after another depending on the configuration of the color template design system. The user selects the template design and source image from the various template designs and source images provided. The source image is further described in FIG. 4. The template design is further described in FIG. 6.

At operation block 205, a histogram is generated based on the selection of the source image. Data is collected from the color of the selected source image and used to generate the histogram. The histogram analyzes the collected source image color data. A histogram is further described in FIG. 5.

At operation block 207, colors for the template design are suggested automatically based on the histogram analysis. The histogram analysis produces a choice of colors that match the color of the source image. All color choices are suggested one at a time for user selection. Alternatively, the color choices are suggested simultaneously or as a set number of color choices at a time that is predetermined by the user or the color template design system. One type of color selection is further described in FIG. 7.

At operation block 209, a color selection is made. The user of the color template design system selects one of the colors choices suggested. The color template design system offers a variety of template designs to the user. If the user chooses to change his mind and change the template design from earlier selected template design, the user can select from a variety of template designs to suit the selected color. The user also has a choice to apply the selected color to the background, foreground, mat or framing portion of the template design. Alternatively, the user can choose to apply the selected color to any one or any combination of the background, foreground, mat or framing portion of the template design.

At operation block 211, the selected color is applied to the template design at the selected portions. The template design with the applied color is displayed to the user. The user saves the displayed template design as the standard template design for the color template design system. As described earlier the display can be a computer, TV, online service, or similar electronic instruments.

Alternatively, the user can save several template designs and have the option of switching back and forth between the saved template designs for retrieving and displaying any of the saved template designs.

Alternatively, a color template design system is configured to allow a user to display and use the selected color template design after the user has paid a service fee to the provider of the color template design system.

FIG. 3 is a flow diagram of one embodiment of an operation 300 to generate a color template design. Operation 300 can be implemented by digital processing system 140. Operation 300 also allows an algorithm to provide and select source images, template designs, and colors for the template designs based on data source image gathered.

Referring to FIG. 3, at operation block 301, a source image and template design is provided for selection. As discussed previously, variety of different template design and source image choices are provided by the color template design system either simultaneously or one after another. A source image and template design is selected by the user from the choices provided.

At operation block 303, a cursor is placed on the source image. Placing a cursor on any one of the provided source images indicates a selection made by the user. A cursor can be placed by either using a computer mouse, a keyboard, a remote control device, a pointer, touching the source on the screen or similar function indicating acceptance of the source image.

At operation block 305, source image data is collected from the selected source image. The data represents the color of the source image. The data is stored or placed in non-volatile storage media, such as flash memory or other types of storage devices for use in applying to the template design. The data collection process is initiated instantly as the user of the color template design system places a cursor on the source image.

At operation block 307, the collected color data is used to adjust the color of the selected template design. The color template design system automatically adjusts the color of the earlier selected template design based on the color data collected from the earlier selected source image. In one embodiment, the automatic adjustment of color on the template design is performed instantaneously, or within a very short time period, as the user places the cursor on the source image. The adjusted color on the template design matches the color of the source image. Alternatively, a color template design system is configured to adjust the color to a contrast or any predetermined variation of the color of the source image.

Alternatively, a system prompt is displayed to the user asking the user to accept the color adjustment. The user accepts the system prompt, and the color template design system adjusts the color on the template design based on source image data collected earlier. Alternatively, the user rejects the system prompt and no color adjustments are performed to the template design.

At operation block 309, a template design with a matched source image color is displayed. The user may choose to save this color template design as a standard color template design for the color template design system.

Figure 4:
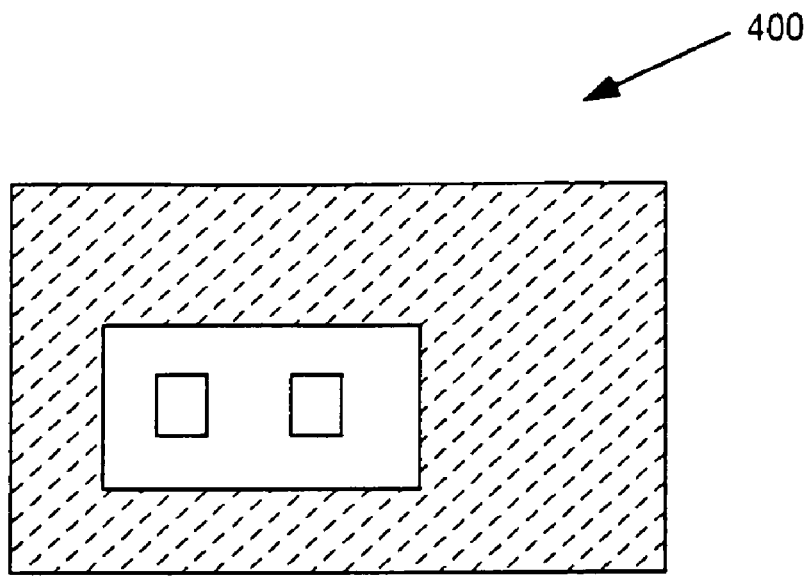
FIG. 4 illustrates one exemplary type of source image according to one embodiment.

FIG. 4 illustrates one exemplary type of source image 400 according to one embodiment. An source image is an image displayed on a display. For example, the image can be a photograph, text, computer icons, or any type of art. Several types of source images are offered by the color template design system for selection by a user. A source image can also be of a variety of different images with various colors and be either part of the color template design system or available as software packages available in the market including images downloaded from the Internet.

Figure 5:
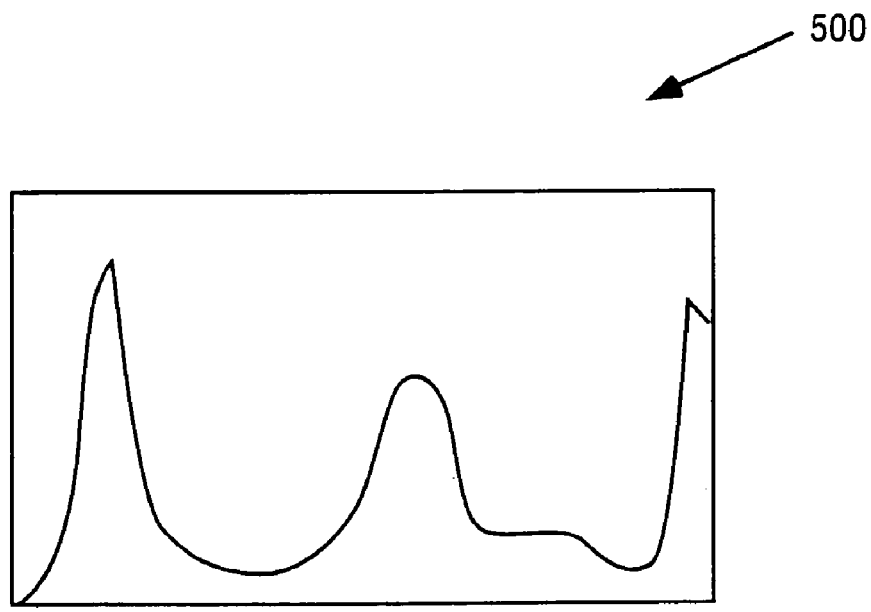
FIG. 5 illustrates one exemplary type of histogram generated based on selection of an source image according to one embodiment.

FIG. 5 illustrates one exemplary type of histogram 500 generated based on the selection of an source image according to one embodiment. A histogram is a bar graph of a frequency distribution in which the widths of the bars are proportional to the classes into which the variable has been divided and the heights of the bars are proportional to the class frequencies. The variable represents color of the observed frequencies.

Figure 6:
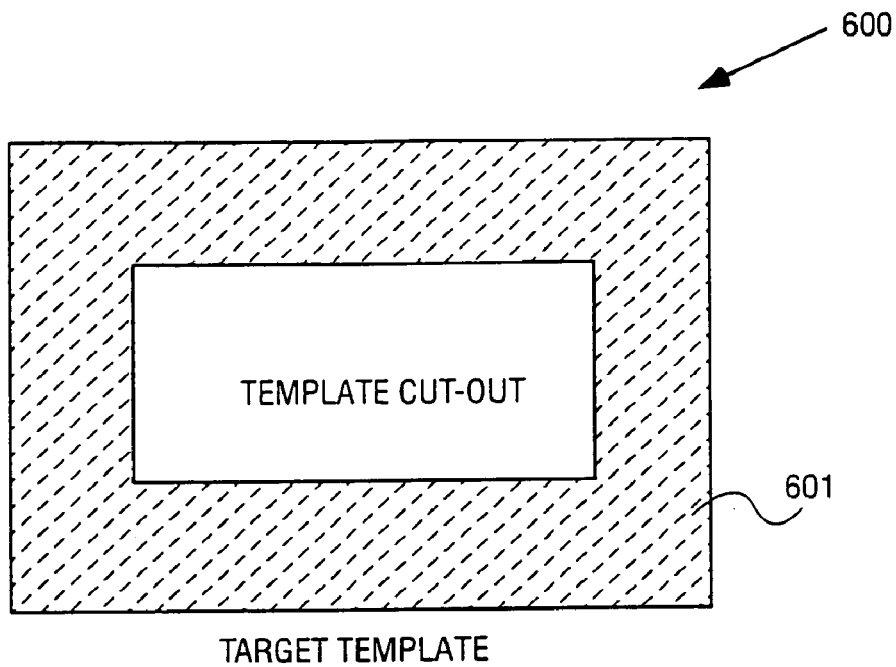
FIG. 6 illustrates one exemplary type of template design according to one embodiment.

FIG. 6 illustrates one exemplary type of template design 600 according to one embodiment. The template design has a background, foreground, mat and a framing portion. Area 601 represents a foreground or background portion. A template design has a cut-out where an source image is placed. The cut-out can vary in shapes and sizes to fit the source image. A user selects from the various template designs with a variety of cut-out portions. Alternatively, the user selects and modifies the template cut-out or any portion of the template design by manually changing the portions to desired levels.

The color template design system offers a variety of template design choices to users for selecting a template design. Alternatively, a variety of template design choices, such as, template software packages available on the market including template designs accessible over the Internet are used by the color template design system.

Figure 7:
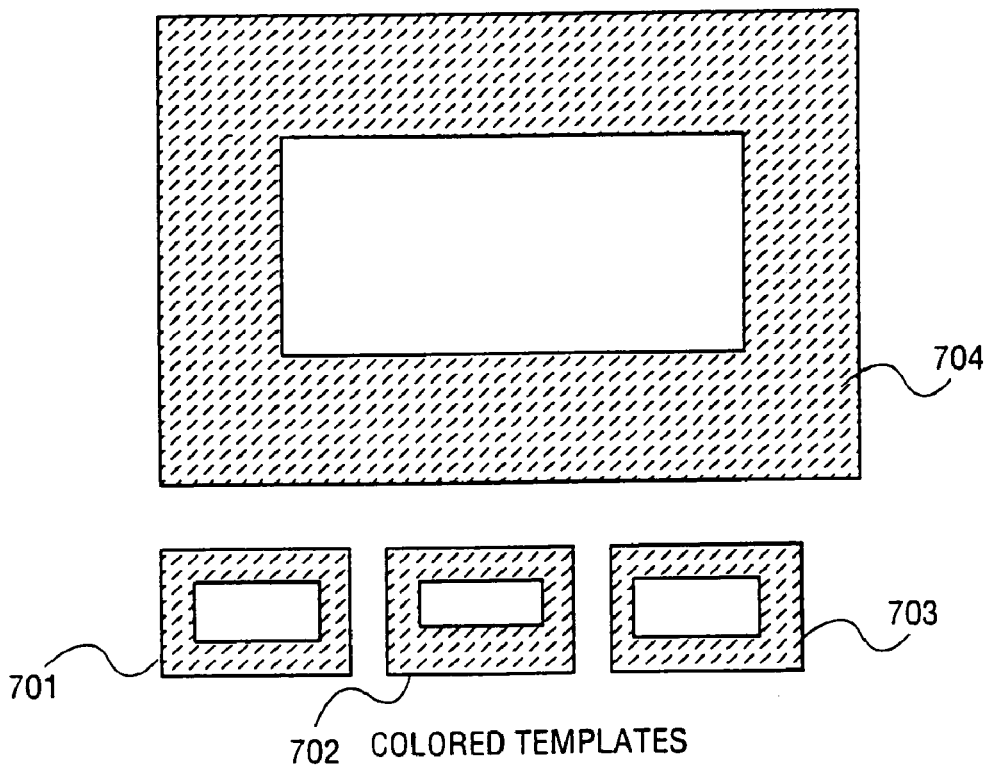
FIG. 7 illustrates one exemplary type of color selection choice menu according to one embodiment.

FIG. 7 illustrates one exemplary type of color selection choice menu 700 according to one embodiment. Operation blocks 701, 702 and 703 are color selections that are different from each other. A user selects any one of the offered selections to adjust the color in any portion of the template design. For example, a user selects a color selection 702 and the color template design system changes the color in area 704 of the template design to color selected at operation block 702.

As discussed previously, any predetermined number of color selections are offered by the color template design system. The color selections are either offered one after another or simultaneously.

An online color template design system has been described that allows a user of the color template design system to select a color template design. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

Also, although separate processing stages have been used to describe the server processing stages, it will be appreciated by those of ordinary skill in the art that any arrangement of processing stages to achieve the same purpose may be substituted for the specific embodiments shown.

The terminology used in this application with respect to networks is meant to include all of environments in which a server computer communicates with client computers to send and receive data. Therefore, it is manifestly intended that this invention be limited only by the following claims and equivalents thereof.

What is claimed is:

1. A computerized method for generating a color template design to format a presentation, the method comprising:
    using a processor to automatically adjust colors of at least one selected template design based on placement of a cursor on a source image that is separate from the template design.

2. The computerized method of claim 1, further comprising:
    displaying the selected template design after automatically adjusting colors; and
    storing the selected template design for use as a template.

3. The computerized method of claim 1, wherein automatically adjusting colors comprises adjusting the colors to contrast with a color of the source image at the cursor.

4. The computerized method of claim 1, wherein automatically adjusting colors comprises adjusting the colors to predetermined variations of a color of the source image at the cursor.

5. The computerized method of claim 1, wherein the selected template design includes a framing portion and a mat portion and at least one of those portions is adjusted based on the placement of the cursor on the source image.

6. A computerized system comprising:
    a processor;
    a memory coupled to the processor through a system bus;
    a computer-readable medium coupled to the processor through the system bus; and
    a color template design module executed from the computer-readable medium by the processor to cause the processor to automatically adjust colors of at least one selected template design based on placement of a cursor on a source image that is separate from the template design.

7. The computerized system of claim 6, wherein the color template design module causes the processor to display the selected template design after automatically adjusting colors, and store the template design for use as a template.

8. The computerized system of claim 6, wherein the color template design module causes the processor to automatically adjust colors by adjusting the colors to contrast with a color of the source image at the cursor.

9. The computerized system of claim 6, wherein the color template design module causes the processor to automatically adjust colors by adjusting the colors to predetermined variations of a color of the source image at the cursor.

10. The computerized system of claim 6, wherein the selected template design includes a framing portion, a mat portion, a foreground portion, and a background portion and at least one of those portions is adjusted based on the placement of the cursor on the source image.

11. A computer-readable medium having computer-executable instructions to cause a server computer to perform a method comprising:
    automatically adjusting colors of at least one selected template design to format a presentation, the adjusting based on placement of a cursor on a source image that is separate from the template design.

12. The computer-readable medium of claim 11, wherein automatically adjusting comprises matching a color of the source image at the cursor.

13. The computer-readable medium of claim 11, wherein the method further comprises:
    displaying the selected template design after automatically adjusting colors; and
    storing the selected template design for use as a template.

14. The computer-readable medium of claim 11, wherein automatically adjusting colors comprises adjusting the colors to contrast with a color of the source image at the cursor.

15. The computer-readable medium of claim 11, wherein automatically adjusting colors comprises adjusting the colors to predetermined variations of a color of the source image at the cursor.

16. The computer-readable medium of claim 11, includes a framing portion and a mat portion and at least one of those portions is adjusted based on the placement of the cursor on the source image.

* * * * *